March 21, 1961 G. A. TINNERMAN 2,975,814
PLASTIC ANCHORING FASTENER WITH DIVERGING SHANKS
Filed Dec. 9, 1957

INVENTOR.
GEORGE A. TINNERMAN
BY Featherstonhaugh & Co.
ATTORNEYS

United States Patent Office 2,975,814
Patented Mar. 21, 1961

2,975,814

PLASTIC ANCHORING FASTENER WITH DIVERGING SHANKS

George A. Tinnerman, 17864 Beach Road, Lakewood 7, Ohio

Filed Dec. 9, 1957, Ser. No. 701,417

1 Claim. (Cl. 151—41.75)

This invention relates to moldable expandable anchoring fasteners of a type to be inserted in an aperture of a mounting member and to receive and hold a threaded stud capable in turn of securing other elements on the mounting member.

Fasteners for this purpose have previously been proposed molded from formable material such as plastic material wherein the fastener is generally comprised by a solid orificed head having two or more shanks integrally connected thereto and projecting therefrom in spaced parallel relation and formed with shoulders thereon, the shanks being compressible to permit the shoulders to pass through an aperture or the like and being expandable by a screw stud to secure the fastener in the mounting member. Such fasteners, however, have numerous disadvantages. The extent of projection of the shoulders is limited by the inherent character of the fastener and the limited extent of compressibility of the shanks, since larger shoulders would otherwise prevent removal of the fastener from the mold, and such shoulders must necessarily be limited in projection at most to one-half the distance existing between the shanks. Moreover, as a result the tolerance between the size of the fastener receiving aperture and the overall span of the shoulders when the shanks are compressed must be relatively fine, otherwise the fastener has not the capacity to anchor firmly and often pulls out. Such fasteners are also subject to shear strain adjacent the head because the shanks at the point of connection with the head are relatively thin and in some cases because of this it has been necessary to incorporate in the head strain relief shoulders necessitating counter-sinking of the mounting members in the area surrounding the aperture in order to accommodate such shoulder. Again, such fasteners do not provide as great a resistance to tensile pull as can be desired. On the one hand, without close tolerances between the fastener and the aperture of the mounting member, the fastener will as indicated tend to pull out. On the other hand, it is well known that plastic material does not impart the same degree of tensile strength as metallic fasteners of similar cross-sectional area and in such present-day available fasteners, the sole uninterrupted circumferential contact between a threaded stud and a plastic anchoring fastener is in the area of the aperture in the head, the thickness of which must necessarily be held to a minimum so that the two complementary parts to be assembled will not be greatly spaced apart in their final disposition. Thus, the head thickness in such present fasteners greatly limits both the tensile strength and torque of the ultimate joint connection of the assembled parts as well as the torque resistance of the anchoring fastener to the tightening of the threaded fastener therein.

The fastener of the present invention obviates these and other disadvantages of the prior art and provides a much stronger fastener, greater resistance to tensile pull, elimination of shear strains arising in the head area, it readily permits fastener construction of varying tensile strength values according to requirements, and permits a formation of wider shoulders for gripping purposes while providing a construction that does not require the close tolerance between the receiving aperture and the fastener body as is the case of said prior fasteners above indicated.

With these and other advantages over such prior fasteners, the invention generally comprises a unitary fastener body including a base of selected depth, a plurality of shank members integral with and rising from said base in spaced apart relation and complementary to one another, each shank member terminating at its opposite end in a lateral projection, said projection forming in conjunction with one another a multi-piece fastener head, said base having a central bore for reception of a screw-threaded stud, said shanks being spaced apart from one another a distance at least equal to the diameter of said bore and forming a channel for passage of said stud from the head to said bore, said shanks being outwardly flared from the head portion to a point of maximum extent intermediate the longitudinal axial extent of said shanks to form shoulders projectable beyond defining edges of said fastener receiving aperture of the mounting member, said head portion and the upper portions of said shanks being contractable for lessening the overall span of said shoulders to cause said shoulders to pass through said aperture and being expandable to engage portions of said shanks adjacent said head with said mounting member, said shanks being engageable by said stud to maintain the latter in firm engagement with said mounting member. Preferably the lateral projection of the opposite end of the shanks forming the head of the fastener is in the form of flanges projecting outwardly of said shanks but which may also project inwardly as well to form a head of larger area and provide an entrant orifice in the head aligned with the orifice in the base. These and other features advantageously demark the present invention from fasteners of the prior art.

All features of the invention will be clearly understood by reference to the following detailed specification taken in conjunction with the accompanying drawings.

Figure 1:
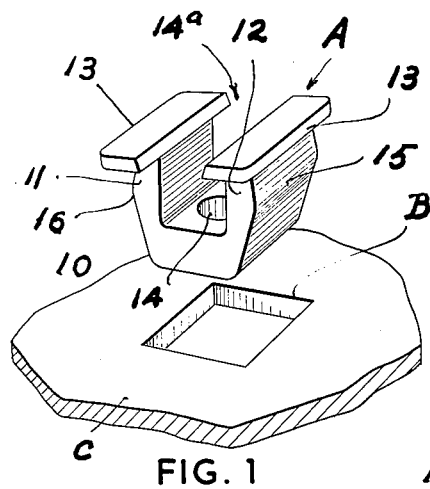
Fig. 1 is a perspective view of a basic form of fastener according to the present invention illustrated in correlation to an aperture in a mounting member, the latter being shown fragmentarily.
Figures 3, 4:
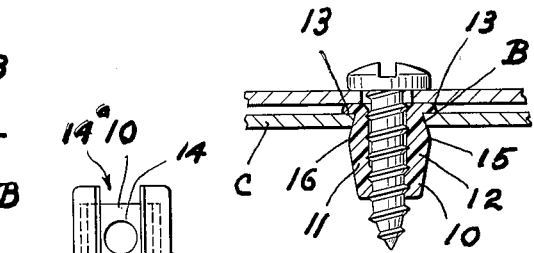
Fig. 3 is a top plan view thereof.
Fig. 4 is a longitudinal section taken through the fastener shown in mounted position in conjunction with a screw threaded stud and a part secured by the head of the stud.
Figures 2, 5:
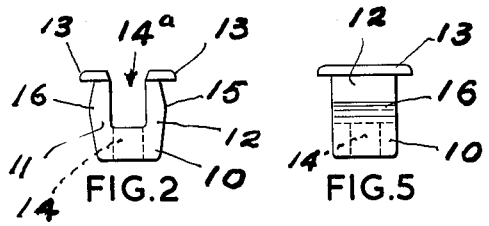
Fig. 2 is a side elevation of the fastener.
Fig. 5 is an end elevation of the fastener.

Referring to the drawings, and particularly to Figs. 1 to 5, A indicates a fastener formed according to the principle of the present invention and which is designed to be received in an aperture B of a mounting member C. The fastener A is formed as a unitary member having a base 10 including a plurality of shank members 11 and 12 integral with and rising from the base 10 in spaced apart relation and complementary to one another. Each shank member terminates at its opposite or head end in a lateral projection 13 forming the head of the fastener, preferably in the form of a flange as shown which preferably projects outwardly of the shanks both beyond the side and end walls thereof. The base is formed with a central bore 14 for reception of a screw threaded stud and the shanks are spaced apart from one another a distance at least equal to the diameter of said bore but in most cases would be spaced to a slightly greater extent than the diameter of the bore and which spacing forms a channel 14a for passage of said stud from the head of the fastener down to and into said bore 14. The outer face of the shanks are outwardly flared from the head portion to a point of maximum extent intermediate the longitudinal axial extent of said shanks to form shoulders 15 and 16 projectable beyond the defining edges of the fastener receiving aperture B of a mounting member C such as shown in Fig. 4.

The fastener as a result of the construction described is formed with a multi-piece head and which is capable of contraction under pressure to permit the fastener to pass through an aperture in which it is to be mounted, and is capable of expansion back to normal form to cause said shoulders to project beyond the inner defining edges of the aperture. Due to the character of the construction described, these shoulders may be formed so as to project to a substantial degree laterally of the shanks since the fastener by reason of its construtcion is capable of ready removal from the forming mold and due to the location of the shoulders in relation to the compressible head of the fastener, i.e. adjacent thereto and to the point of maximum contraction of the shanks, it is clear that the fastener may be caused to pass through an aperture of close tolerance in relation to the cross-sectional dimensions of the fastener, and notwithstanding substantial projection of the shoulders, as well as to pass through an orifice of larger proportions. In the case of the latter, the projection of the shoulders will permit of a secure fastening once the screw stud has been secured. This is in advantageous comparison with prior fasteners embodying a solid head and spaced freely projecting shanks where the shoulders must be located at a point of minimum contraction (and conversely minimum expansion) of the shanks; said shoulders must be of limited outward projection, and the shanks are limited in their outward movement under influence of the screw stud since the receiving orifice in the fastener head cannot be any smaller than the minimum diameter of the screw thread and outward movement of the shanks is substantially limited to the difference between the diameter of said receiving orifice and the maximum diameter of the thread of the stud.

The fastener A is preferably formed from a plastic material and one softer than the material of the stud so that the threads of the latter will operate to cut a threaded path in the fastener. However, it will be understood that the fastener may have threads formed in its bore 14 if desired, and in the inside walls of the shanks 11 and 12. Moreover, by use of a contractable pin in the forming mold, the inner faces of the shanks may be formed with a groove for reception of and guidance of the stud as it is directed to the orifice 14.

Figure 8:
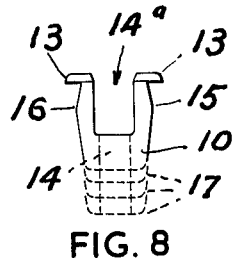
Fig. 8 is a side elevation of the fastener shown in Figs. 1 to 5 but illustrating by dotted extensions the manner in which the base of the fastener may be selectively increased in thickness to increase the tensile strength values of the fastener and resistance to tensile pull.
Figure 9:
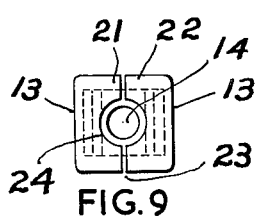
Fig. 9 is a top plan view of an alternative form of fastener in which the head of the fastener projects laterally both inwardly and outwardly of the shanks, the inward projecting portion being recessed to form an entrant orifice in the head aligned with the orifice in the base of the fastener.

At this point, reference is made briefly to Fig. 8, wherein, by means of the successive series of dotted lines 17, the adaptability of the fastener to an increase in the depth of the solid base 10 is illustrated. Thus the structure lends itself to use of a base of relatively thin depth and which can be progressively increased to match the increase in tensile demand to suit the stipulated strength requirement since in most instances of use, there are no minute space limitations in the area occupied by the base of the fastener. Such increase in depth can readily be provided for by employing in the molding of the fastener a replaceable insert (or group of inserts) in the section of the die which forms the base portion. It will be clear, therefore, that a fastener of great strength and resistance to tensile pull is achieved and which, due to the selected thickness of the base, will provide greater area of contact between the thread of the screw and the thus elongated uninterrupted bore 14 of the fastener.

The screw-threaded stud 18, preferably of uniform diameter in its extent adapted to contact the fastener, is designed in effect to fill the channel 14a and rigidify the shanks in their contact with the defining edges of the fastener receiving aperture B of mounting member C. As shown in Fig. 4, the threads thereof only partially cut into the inside faces of the shanks 11 and 12 but, of course, fully cut into the defining wall of the orifice 14.

The fastener A as mentioned is preferably molded from plastic material of a character softer than the threaded stud and may be formed from polyhexamethylane adiptamide, polystyrene or other such material of somewhat ductile character and which will permit contraction and expansion of the shanks of the fastener and cooperative securing engagement of the threaded stud. The fastener is also adapted to be molded to a shape which will provide against turning thereof in its mounting when the stud is being secured therein. As shown in the drawing, the fastener is given a substantially rectangular cross-section but it is to be understood that it is not limited to such shape but may be given a configuration suitable for its appreciation including ovular, triangular shape or one of rounded character. Furthermore, it will also be clear that it is adaptable to a construction including more than two shanks.

Figure 6:
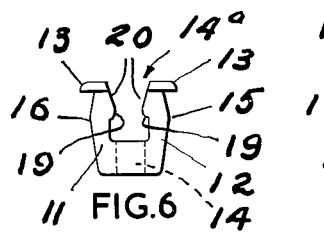
Fig. 6 illustrates a slightly modified form of fastener embodying pressure exerting projections formed on the inner faces of the shanks of the fastener.

Reference is now made to the remaining figures of the drawing. In Fig. 6, the fastener is modified by the inclusion of a pair of opposed protuberances 19 on the inner faces of the shanks 11 and 12, to form intermediate the longitudinal extent of said shanks a restriction in the channel 14a of a span equal to or less than the diameter of the bore 14. The uppermost portion 20 of the inner surfaces of the shanks are downwardly and inwardly flared from the top of the channel 14a at the head of the fastener to the protuberances 19 so that the threaded stud as it passes into the channel 14a will urge the shanks into a closer or tighter engagement with the edges of the fastener receiving aperture B in which it is positioned.

Figure 7:
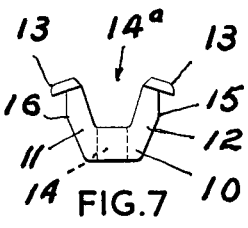
Fig. 7 shows a further modified form wherein the shanks outwardly diverge from one another.

In Fig. 7, the shanks 11 and 12 are molded to diverge from one another so that when contracted as the fastener is introduced to a receiving aperture, a natural outward pressure will be exerted against the defining edges of the receiving aperture, the shanks being in effect rigidified in such engagement upon the introduction of the screw stud.

Figure 10:
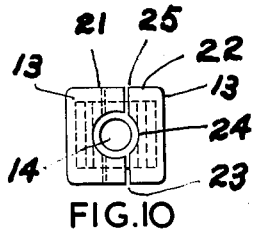
Fig. 10 is a further alternative similar to Fig. 9 but wherein the inner edges of the projecting portions of the head are subject to interlaps with one another.
Figure 11:
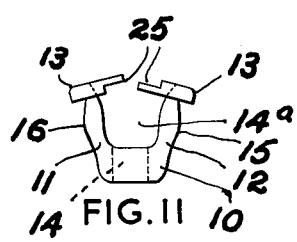
Fig. 11 is a further alternative showing a construction similar to Fig. 10 but wherein the shanks are formed to diverge outwardly from one another.
Figure 12:
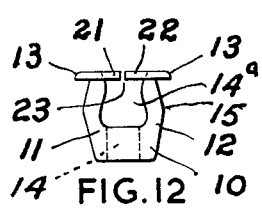
Fig. 12 is a side elevation of the form of fastener shown in Fig. 9.
Figure 13:
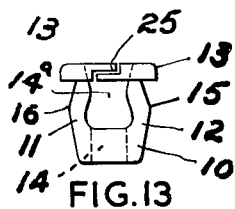
Fig. 13 is a side elevation of the form of fastener shown in Fig. 10.

As shown in Figs. 10 and 13, the head portion is given an increased area by extending the flange portion inwardly on each shank towards each other as by the flanges 21 and 22, the inner edges of which are spaced from each other as at 23 to a desired degree to permit flexing or contraction of the shanks. Such inner edges are also formed with complementary inwardly directed recesses jointly to form a pilot orifice 24 in the head for the guidance of the screw stud. A similar treatment occurs in the alternative structure of Figs. 10 and 13 which in addition includes, as well as a desired spacing of the flanges, a complementary stepping 25 of the adjacent edges of flanges 21 and 22 permitting them to interlap. Similar treatment is provided in the case of Fig. 11 with the exception that the shanks 11 and 12 are outwardly divergent in a similar manner to the case of Fig. 7.

It will be obvious from the foregoing that the present invention provides a simple, practical fastener construction readily molded in mass production and providing many advantageous features by way of strength, firm anchorage, tensile pull resistance and among others an avoidance of the necessity of closer aperture tolerances than are generally found in mounting members by reason of economic necessity in mass production industry.

What I claim as my invention is:

A moldable, one piece plastic expandable anchoring fastener for insertion within a receiving aperture of a mounting member comprising a unitary body including a base, a plurality of flexible shank members integral with and rising from said base in spaced apart relation and complementary to one another, each shank member terminating at its opposite end in a laterally projecting head member forming a shoulder, said head members forming in conjunction with one another a multi-piece fastener head, said base having a central bore for reception of a stud, said shanks being spaced apart from one another at said base a distance at least equal to the diameter of said bore, the inner surfaces of said shanks being inclined to the central axis of the bore upwardly and outwardly of said base, the opposite outer surface of said shanks adjacent to the head members being substantially parallel to the axis of said bore, the continuing and joining outer surface of said shanks located adjacent to the base being inclined outwardly and upwardly therefrom substantially parallel to said inner surfaces complementary thereto, the plane of said shoulder of the head members of each shank being disposed substantially normal to the plane of said inner surface of said shank, said shanks being thereby spaced apart a greater distance at the head members than at the base, said shanks being compressible towards one another for insertion of said fastener in said aperture and being capable of flexing outwardly to engage opposed edges thereof.

References Cited in the file of this patent

UNITED STATES PATENTS

| | | |
|---|---|---|
| 2,184,783 | Tinnerman | Dec. 26, 1939 |
| 2,343,238 | Manning | Mar. 7, 1944 |
| 2,376,167 | Mitchell | May 15, 1945 |
| 2,788,047 | Rapata | Apr. 9, 1957 |
| 2,836,214 | Rapata | May 27, 1958 |
| 2,848,746 | Thielen | Aug. 26, 1958 |

FOREIGN PATENTS

| | | |
|---|---|---|
| 556,544 | Great Britain | Oct. 8, 1943 |